United States Patent [19]

Kany

[11] 4,433,055
[45] Feb. 21, 1984

[54] DECOMPOSING PLANT

[76] Inventor: Manfred Kany, Feldstrasse 9, D-6601-kleinbliltersdorf 5, Fed. Rep. of Germany

[21] Appl. No.: 373,124

[22] Filed: Apr. 29, 1982

[30] Foreign Application Priority Data

May 2, 1981 [DE] Fed. Rep. of Germany ....... 3117451

[51] Int. Cl.³ .............................................. C12M 1/04
[52] U.S. Cl. ................................... 435/313; 435/819; 210/202; 210/253; 422/184
[58] Field of Search .................. 71/9, 8, 12; 435/301, 435/313, 819, 818; 422/184, 193, 195, 194; 210/620, 199–202, 241, 253

[56] References Cited

U.S. PATENT DOCUMENTS

| 3,438,740 | 4/1969 | Brown | 71/9 |
| 4,108,609 | 8/1978 | Petzinger | 422/194 |
| 4,139,640 | 2/1979 | Kipp, Jr. | 71/9 |
| 4,326,874 | 4/1982 | Bürklin | 422/184 |

Primary Examiner—Benoit Castel
Attorney, Agent, or Firm—Kontler, Grimes & Battersby

[57] ABSTRACT

A decomposing plant for refuse comprises cells which are disposed one next to the other and wherein the material is held by a bottom and by sidewalls. In order to transfer the material from cell to cell, there is provided a transfer unit which can be transported along the series of cells and driven into the cells. The transfer unit comprises a conveyor band capable of passing over a sidewall. From one cell to the next cell and provided with spray nozzles for subsequent moistening of the material.

26 Claims, 3 Drawing Figures

DECOMPOSING PLANT

BACKGROUND OF THE INVENTION

The invention relates to a decomposing plant, especially for refuse. More specifically, the invention relates to a decomposing plant having successive cells disposed side by side at substantially the same level in which material to be decomposed is held by a bottom and by sidewalls, devices for aerating the cells and devices for transferring the material from cell to cell.

Multi-storey decomposing plants up to 30 meters high are known wherein the material to be decomposed is stored on a series of intermediate floors and is caused to descend at predetermined intervals of time onto next lower intermediate floors so as to undergo a mixing and restratifying action. Openings are provided in the intermediate floors and closing and displacing apparatus of all kinds serve the purpose of transferring the material being decomposed onto next intermediate floors or into cells which are formed thereabove. Additional mixing tools, which cooperate in part with the transfer devices and are in part independent, are also in use.

An advantage of such multi-storey decomposing plants is that they allow for an advantageous setup of the decomposition area and for quite satisfactory regulation of the decomposition process. However, the outlay for construction and transfer and mixing apparatus is extremely high, and the same applies for repairs and maintenance work. Moreover, the most serious drawback is that disturbances in operation, such as jamming of flaps, rotary floors, mixing arms, etc., are often difficult to localize and, in most instances, can be eliminated only with substantial outlay in manhours including extensive shoveling of material from the interior of the cells.

An alternative to multi-storey decomposing plants is composting by stacking. However, while composting by stacking is simple and free of disturbances, it is unsatisfactory in other respects.

Altogether, composting by stacking is possible only with coarse materials. Otherwise, one cannot ensure aeration even if the stack is placed on top of an aerating channel. The inclined sides of the stack prevent sufficient regulation of aeration, there is always too much or too little aeration somewhere. The release of heat and moisture is excessive; furthermore, it cannot be regulated to a sufficient degree. This also applies for stack type composting in halls. Moreover, such composting renders the process more expensive since the space requirements of stacks are substantial, also for rearranging of the layers.

OBJECTS AND SUMMARY OF THE INVENTION

An object of the invention is to provide a decomposing plant which is simple, reliable in operation, sufficiently regulatable and efficient.

In accordance with the invention, this object is accomplished by a decomposing plant of the aforedescribed type wherein the cells are disposed on substantially the same level, one next to the other. The material in the cells which are disposed on substantially the same level, one next to the other is decomposed just as reliably, rapidly and controllably as in cells of a multi-storey decomposing plant which are disposed one above the other. However, the plant is incomparably simpler and more reliable in operation.

It can be erected at ground level from relatively thin concrete and, therefore, in addition to a relatively low hall, it requires only extremely low initial costs in comparison with a multi-storey reactor with cells which are disposed one above the other. Moreover, it is much more durable. The transfer of material from cell to cell might be somewhat more expensive than in a multi-storey reactor; however, on the other hand one dispenses with considerable repair and maintenance work which is rendered necessary by the numerous transporting apparatus of a multi-storey reactor. The nearly total elimination of any rust protection—save for the transfer device, practically the entire plant can consist of concrete and other rustproof material—brings about substantial savings.

At the same time, the new plant can conform much better to the surroundings. Especially in uneven terrain, it can be recessed into the ground, either entirely or in part, covered with grass, etc. In many instances, this actually renders it possible altogether to install an efficient decomposing plant where it might not otherwise have been possible to erect a decomposing plant because the building authorities permit the erection of multi-storey reactors only in a few zones.

The novel decomposing plant is safe in operation because its erection substantially at ground level renders all cells and the material which is stored therein more readily accessible and because one can achieve extensive simplifications in comparison with a multi-storey reactor.

In this respect, an especially advantageous embodiment of the invention is that wherein the devices for transferring the material are consolidated essentially into a unit which is movable along the series of cells and can also be driven into the cells.

Such a transfer unit is always readily accessible in the event of disturbances and is even rapidly replaceable by another unit. The unit can be accessed or replaced at any time and without interruptions in operation of the decomposing plant for normal maintenance work, examination and repairs. This is an advantage per se but it also serves to enhance the safety of operation.

Furthermore, all of the cells can be provided with doors in such a way that, if necessary, they are accessible to wheel-mounted loaders for simple and expeditious removal of material therefrom.

It is advantageous to place the cells, which preferably form a straight row, side by side with their longitudinal sides being adjacent, such that they are accessible to the transfer unit at one of their short sides through doors leading into a corridor. At their other short sides, the cells are accessible to wheel-mounted loaders through additional doors, if necessary in the wall of the hall.

The devices for aerating the cells preferably comprise aerating channels which are disposed below the cells and are covered by grates and air withdrawing devices which are disposed above the cells.

The transfer unit can be moved along the row of cells by a driven platform and can be driven from the platform into the cells along rails which extend along both sides of the aforesaid grates. The transfer unit or cells are preferably provided with devices for moistening the material.

Furthermore, it is proposed more specifically that the transfer unit comprise a receiving apparatus with a driven endless scraper chain which presents an upwardly moving reach to the material front and from which extends at least one chute, if necessary also other conveyor means, back to the transporting device, e.g., a conveyor band or a pneumatic conveyor which leads over the wall of the open-top cell to the next cell. Behind the discharge end of the transporting device, there is preferably provided on the transporting device a scraper type distributor which extends substantially along the width of the next cell.

A material supplying device advantageously discharges into the first one of the cells, preferably above a liftable and lowerable scraper type distributor which sweeps substantially the area of the cell.

The last cell preferably comprises a funnel-like convergent bottom and an evacuating device thereon.

BRIEF DESCRIPTION OF THE DRAWING

The drawing illustrates one embodiment of the invention.

DESCRIPTION OF THE PREFERRED EMBODIMENTS

Figure 1:
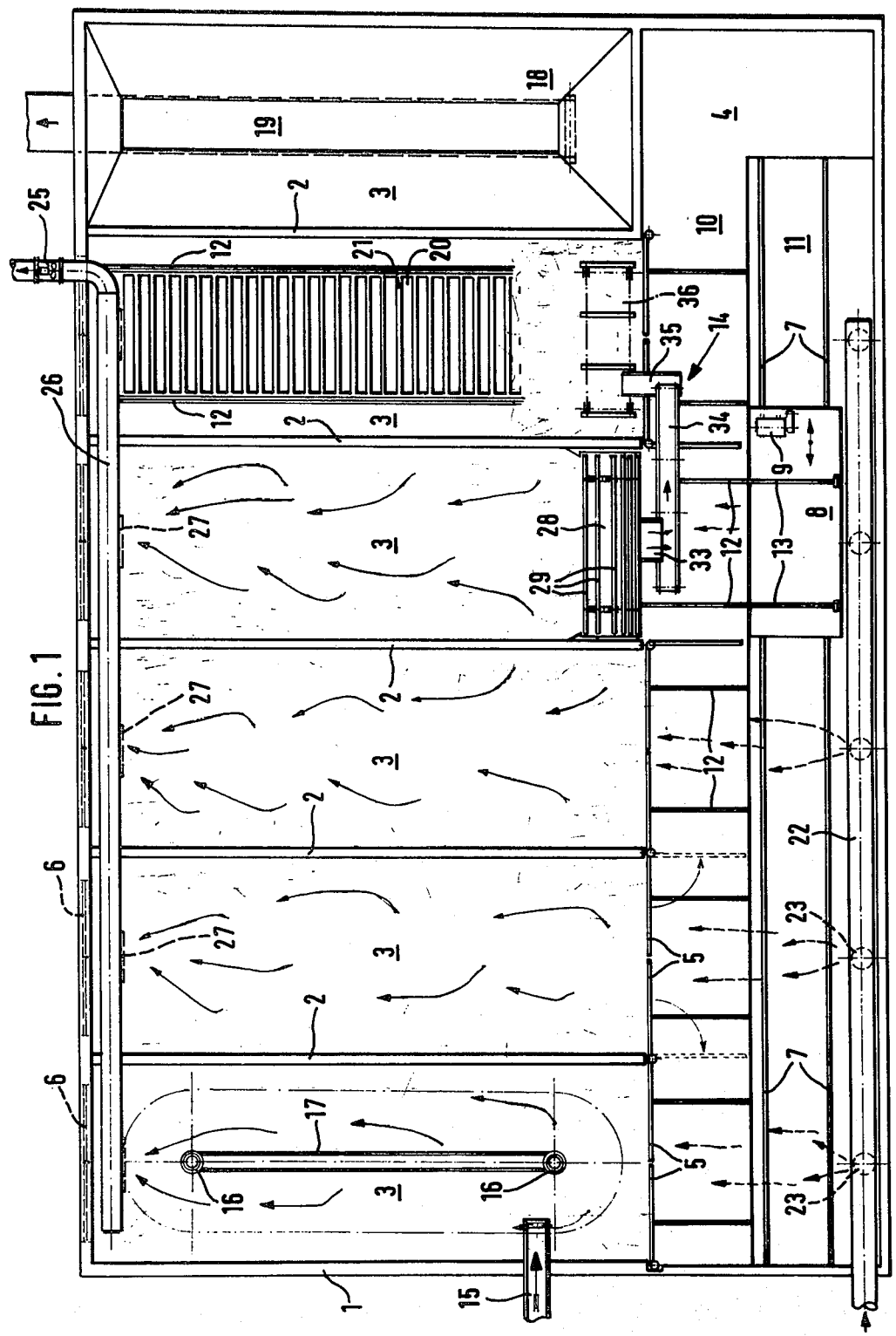
FIG. 1 shows a plan view of a decomposing plant which is disposed in a hall, with the roof of the hall removed.
Figure 2:
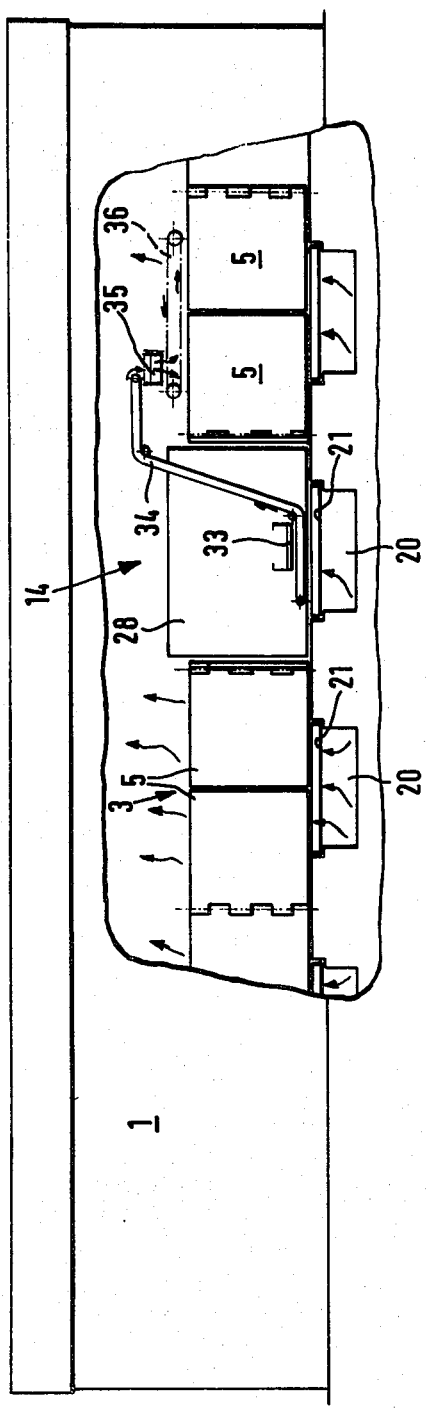
FIG. 2 is an elevational view of the decomposing plant, with the wall of the hall partly broken away.

A single-storey hall 1 is subdivided by partitions 2 into elongated cells 3 which are open at the top. In actual practice, the length of the hall and the number of cells will greatly exceed that which is shown in the drawing.

A corridor 4 extends along the short sides of the cells 3. From this corridor, the cells 3 are accessible along their full width through double doors 5. The other short sides of the cells are provided with doors 6 in the wall of the hall.

A shifting platform 8 is movable by a drive 9 along rails 7 in the corridor 4. The rails 7 are installed in a recessed portion 10 of the corridor 4 in such a way that the upper side of the shifting platform is disposed at the level of the remaining portion 11 of the corridor. Portion 11 has a width which approximates the width of the panels of double doors 5. Portion 11 accommodates, at each of the cells, the end of a discrete pair of rails 12 which extend into and substantially along the full length of the corresponding cell and can be brought into register with a pair of rails 13 on the shifting platform 8. A transfer device 14, which will be described in detail hereinbelow, is movable along the pairs of rails 12 and 13.

A material supplying device 15 discharges through the wall of the hall and into the first one of the cells 3 at a level slightly above the partitions 2. A scraper type distributor 17, which is not illustrated in detail but is known to those skilled in the art is disposed in its operative position below the supplying device and immediately above the contemplated level of the top of the pile and is suspended on and movable up and down by hydraulic cylinders 6 which extend downwardly from the roof of the hall. Distributor 17 travels along an endless path and pushes the material which has accumulated above a contemplated level further on to a location where such level has not been reached as yet; it descends there to a lower level.

The last cell 3 comprises a funnel-like convergent bottom 18 and, at the lowermost part of the bottom, a conveyor band 19 which leads from the cell 3 through the wall of the hall.

In order to aerate the material, an aerating channel 20 is provided below each of the cells 3 and is covered by a grate 21 extending between the respective pair of rails 12. The grate 21, as well as the remaining part of the bottom and the walls of the cells and of the hall, can consist of concrete. The aerating channels 20 can be individually connected with a common air supplying conduit 22 through branches 23 which contain fans 24 or the like. A common air withdrawing conduit 26, which is provided with a fan 25, comprises suction openings 27 which are located above the cells 3 and each of which is also adjustable individually for the respective cell.

The transfer device 14 comprises an endless driven scraper chain 28 which is mounted on a machine frame, not shown, and has bars 29 whose length equals the width of the cells 3. The front reach of the scraper chain 28, which acts upon the material, travels upwardly. Two chutes 30 and 31, which are disposed between the two reaches of the scraper chain, extend rearwardly from the upwardly moving reach to discharge onto two short conveyor bands 32 which converge above a further chute 33 which in turn discharges to a conveyor band 34. The conveyor band 34 travels at an angle upwardly over the partition 2 and its discharge end is located above the next cell 3. In order to retain the material on the inclined portion of conveyor band 34, the latter is provided with suitable entraining elements; and the slope can be less pronounced than shown in the drawing. Below the discharge end of the conveyor band 34, there is positioned a short conveyor band 35 in such a way that the material in the respective cell can be piled up all the way across and to the end of the cell with resort to a scraper type distributor 36 when the scraper chain 28 abuts against the end of the preceding cell.

Furthermore, the transfer device 14 is provided with non-illustrated spray nozzles to moisten the material during transfer in order to impart to the material, which is dried as a result of aeration and withdrawal of air, a moisture content which is required for the decomposition process. However, it is also possible to install other types of moistening devices, for example, above the cells.

Figure 3:
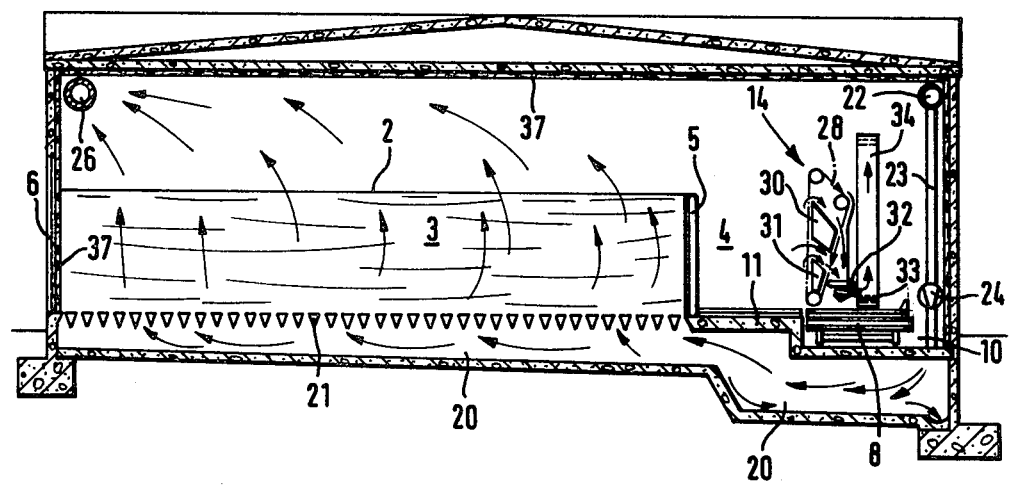
FIG. 3 is a transverse sectional view of the decomposing plant.

Finally, it is worthy to mention a heat insulation 37 which is provided along the walls and the roof of the hall and is shown only in FIG. 3. If the cells are not disposed in a hall but instead outside in open air, they would be covered and their outer sides would also be insulated in such a way that the decomposition would take place in a heat-insulated structure.

The mode of operation of the plant follows substantially from the preceding description.

In the event of transfer at two-day intervals, one can obtain a stabilized compost with fifteen cells within a month.

I claim:

1. A decomposing plant for refuse comprising:
   (a) decomposing means including a plurality of discrete decomposing compartments for decomposing material in batches, said compartments being disposed at substantially the same level, and each of said compartments being bounded by a sidewall having first sides and second sides, said compartments being disposed with first sides of successive compartments adjacent to one another, and selected ones of said second sides being provided with doors for access to the respective compartments;

(b) inlet means for admitting material to be decomposed into said decomposing means;

(c) outlet means for evacuating material which has undergone decomposition from said decomposing means;

(d) transfer means for transferring a batch of material between successive compartments in a direction from said inlet means towards said outlet means, said transfer means comprising a unit which is movable along and into said compartments, and said unit including means for transporting material over said sidewalls from one compartment to another; and (e) aerating means for aerating the material in said compartments 2. The plant of claim 1 further comprising an enclosure inside of which said compartments are contained, said compartments being open at the top.

3. The plant of claim 1, wherein said aerating means comprises openings in the bottoms of said compartments and aerating channels disposed below said bottoms.

4. The plant of claim 3, wherein said aerating means further comprises air evacuating means disposed above said compartments.

5. The plant of claim 3, wherein said bottoms comprise grates provided with said openings.

6. The plant of claim 1, wherein said transfer means further comprises a mobile platform which is movable along said compartments and upon which said unit is mounted.

7. The plant of claim 6, comprising rails which lead away from said platform into said compartments; and wherein said unit is movable from said platform into a particular compartment along the corresponding rails upon alignment of said platform with said particular compartment.

8. The plant of claim 7, each of said compartments having a bottom, and said aerating means comprising grates in the respective bottoms and aerating channels below said grates; and wherein the rails in each compartment include a pair of spaced tracks which extend along opposite sides of the respective grate.

9. The plant of claim 6, wherein said mobile platform is provided with first rails for said unit; and further comprising second rails which extend along said compartments and on which said mobile platform is mounted, and third rails leading away from said mobile platform and into said compartments, said unit being mounted for movement from said platform into a particular compartment on said first and third rails upon positioning of said mobile platform in front of said particular compartment and alignment of said first rails with the respective third rails.

10. The plant of claim 1, wherein said unit further comprises a receiving apparatus having a moving endless scraper chain having an upwardly moving reach which addresses material in a particular compartment into which said unit is driven, and at least one chute to which material from said scraper chain is delivered, said chute thereupon delivering the material to said transporting means.

11. The plant of claim 10, wherein said unit comprises conveyor means arranged to receive material from said chute and to deliver the material to said transporting means.

12. The plant of claim 1, comprising a scraper type distributor which is disposed below the discharge end of said transporting means and extends substantially across the width of the next compartment.

13. The plant of claim 1, further comprising means for moistening the material to facilitate decomposition.

14. The plant of claim 1, wherein said transporting means comprises a belt conveyor.

15. The plant of claim 1, wherein said transporting means comprises a pneumatic conveyor.

16. The plant of claim 1, comprising an enclosure for said compartments.

17. The plant of claim 1, wherein said selected second sides defines a corridor in said enclosure.

18. The plant of claim 1, wherein said compartments are substantially rectangular.

19. The plant of claim 1, wherein said compartments are disposed along a substantially straight line.

20. The plant of claim 1, wherein said outlet means comprises an additional compartment having a bottom which is provided with an evacuating device.

21. The plant of claim 20, wherein said evacuating device comprises a belt conveyor.

22. The plant of claim 1, each of said sidewalls comprising first and second short sides and elongated longitudinal sides; and wherein said compartments are disposed in a straight row with longitudinal sides of neighboring compartments being located adjacent to one another, said first short sides all facing in a common first direction and said second short sides all facing in a common second direction, said first and second short sides being provided with doors for access to the respective compartments.

23. The plant of claim 22, comprising an enclosure for said compartments; and wherein said enclosure is a single-storey structure having first and second sidewalls and a roof, said first sidewall including said first short sides and the corresponding doors so that said compartments are directly accessible from outside said enclosure.

24. The plant of claim 2 wherein said second short sides and said second sidewall define a corridor within said enclosure and access to said compartments through said doors of said second short sides is possible from said corridor.

25. The plant of claim 1, wherein said inlet means comprises material supplying means for discharging material to be decomposed into one of said compartments; and further comprising a scraper type distributor mounted for up-and-down movement and arranged to sweep at least the major part of the area of said one compartment, said material supplying means being arranged to discharge the material into said one compartment at a point above said distributor.

26. The plant of claim 1, wherein said outlet means comprises an additional compartment having a funnel-like convergent bottom which is provided with an evacuating device.

* * * * *